Dec. 29, 1959 W. J. DEGNEN 2,919,240
MEANS FOR INTRODUCING LIFT GAS TO VERTICAL
CATALYST RISER WITHIN A REACTION CHAMBER
Filed Feb. 29, 1956 2 Sheets-Sheet 2

INVENTOR.
WILLIAM J. DEGNEN

BY

ATTORNEYS

United States Patent Office 2,919,240
Patented Dec. 29, 1959

2,919,240

MEANS FOR INTRODUCING LIFT GAS TO VERTICAL CATALYST RISER WITHIN A REACTION CHAMBER

William J. Degnen, Westfield, N.J., assignor to The M. W. Kellogg Company, Jersey City, N.J., a corporation of Delaware Application February 29, 1956, Serial No. 568,597

12 Claims. (Cl. 208—47)

This invention relates to an improved apparatus and conversion process for effecting the conversion of a fluid reactant employing finely divided fluidized contact material in a conversion zone. In one aspect, this invention relates to a method and apparatus for conveying contaminated contact material from the bottom of a reaction zone into a settling zone. Although the invention is described with respect to a hydroforming process for the conversion of naphthas to cyclic compounds, in its broadest aspect, the invention is applicable to any conversion process wherein a reactant is contacted with a fluidized bed of contact material and the contact material is transferred to another zone.

Numerous proposal have already been made for performing continuous contact operations wherein the fluidized finely divided solid material is in contact with a reactant which contaminates the solid material and the contaminated solid material is transported through a multiplicity of treating zones. Moreover, extensive of complicated interconnecting conduits, expensive to install and maintain, constituting a constant source of heat losses and operating difficulties, have been required for accomplishing transporting of solid contact material and recovery of reaction products.

The catalytic hydroforming of petroleum naphthas with a hydroforming catalyst, such as molybdena-alumina in a single fluidized solid catalyst bed, is known to upgrade and produce compounds of higher octane while operating under suitable operating conditions. Generally, the hydroforming of petroleum naphthas to produce cyclic compounds of a higher octane rating is carried out at a temperature of 875 to 1000° F. and a pressure of 100 to 500 p.s.i.g. The naphtha feed is preheated to a temperature below which thermal cracking takes place, approximately 1000° F. prior to entering the reactor which imparts approximately 20 percent of the heat of the reaction, approximately 50 percent being furnished by the recycle gas and the catalyst supplying approximately 30 percent of the heat in the reactor. The hot reactant feed and recycle gases are converted under the reaction conditions to desirable reaction products with deposition of carbonaceous material on the fluidized contact material and a portion of the reactant products are retained on the particles of the fluidized bed. The contaminated contact material is then withdrawn from the bottom of the reaction zone and transferred through vertical rises to an accumulation zone and stripping zone for removal of occluded reaction products prior to regeneration in a separate regeneration zone. The present invention is concerned primarily with an improved method and apparatus for transferring finely divided solid contact material through a plurality of chambers confined within a unitary reaction vessel, and pertains more particularly to the method and apparatus for introducing lift gas to a vertical conduit for transporting finely divided contact material from the lower portion of the vessel to an accumulation chamber in the upper portion thereof.

An object of this invention is to provide an improved method and apparatus for transferring finely divided solid contact material through a plurality of chambers.

A second object of this invention is to provide an improved method and apparatus for reducing erosion of apparatus and catalyst attrition in transferring finely divided contact material from one zone to another.

Another object of this invention is to provide an improved means for controlling the rate of withdrawal of contaminated contact material in the reaction zone.

Still another object of this invention is to eliminate the expansion and contraction problems associated with a movable conduit inserted into the bottom of the reaction chamber.

Various other objects and advantages of the present invention will become apparent to those skilled in the art from the accompanying description and disclosure.

According to the improved process of the present invention, a hydrocarbon reactant is contacted with a fluidized bed of catalyst in the bottom of a reaction vessel which is a vertically elongated vessel containing a reaction chamber in the lower portion with an accumulation and stripping chamber in the upper portion of the vessel. Contaminated catalyst obtained during conversion of the hydrocarbon reactant is withdrawn from the bottom of the reaction vessel and transferred with lift gas through a substantially vertically confined zone to an accumulation chamber above the reaction chamber. The rate of transfer of the contaminated catalyst withdrawn and passed through the vertical confined zone is controlled by the volume of lift gas introduced to the bottom of the vertical catalyst transfer conduit. The catalyst is separated from the left gas in the accumulation chamber along with some occluded products of reaction and then passed to a stripping zone. The stripping chamber, accumulation chamber and reaction chamber are in open communication with one another whereby products of reaction are commingled from each chamber and removed from the reaction vessel.

According to one embodiment of the present invention, as shown by Figure 1, a unitary and integrated vessel is provided containing an accumulation zone and a stripping zone in the upper portion of the vessel of smaller diameter, with the reaction zone in the lower portion thereof. The advantages of such a unitary vessel are manifold, in that it is simple and economical to manufacture by elimination of elaborate interconnecting conduits and supporting structure, provides a system of minimum heat loss, and provides a system for transfer of fluidized contact material through a plurality of interconnecting zones with a minimum of transfer equipment. Since the flow of the finely divided catalyst material throughout the several contacting zones is basically a function of the differential in pressure due to catalyst head, the unitary system of the present invention takes maximum advantage of this basic principle to transfer the catalyst from one zone to another. By reducing the head in the catalyst lift lines, with lift gas, for transferring the catalyst from the bottom of the reaction zone to the accumulation zone positioned above the reaction zone, a minimum of auxiliary equipment is required to maintain catalyst flow through a plurality of contact zones.

More specifically, the present invention is directed to an improved method and apparatus for passing fluidized contact material or catalyst from the bottom of a first zone to a second zone positioned above said first zone, which is economical to maintain, simple to operate and not affected by problems associated with expansion or contraction of the vessel during changes of temperature. Suitable transporting gases or lift gas, such as recycle gases, heated to a temperature of approximately 1100° F. are introduced into the bottom of a vertical catalyst riser or conduit by a suitable gas nozzle extending vertically upward for a short distance into the bottom of the catalyst transfer conduit, thereby forming an annular zone between the gas nozzle and an enlarged section at the bottom of the vertical catalyst transfer conduit. The catalyst withdrawn from the reaction zone passes through the annular zone and is transported vertically upward through tthe transfer conduit as a relatively dilute catalyst phase to an accumulation chamber thereabove, with the rate of catalyst transfer controlled by the volume of lift gas passed through the nozzle. Although not specifically defined in the present invention, the volume of lift gas through the nozzle may be controlled as a function of the catalytic activity, reaction temperature or product control.

The present invention bay be best understood and described by reference to the accompanying drawings which show the inventive features of the present invention as applied to the hydroforming of napthas to produce cyclic compounds. It is to be understood that the process is not to be limited to hydroforming, but is applicable to any process wherein a reactant is contacted with a finely divided solid contact material.

Figure 1 of the drawings is a diagrammatic illustration in elevation of an arrangement of apparatus for the hydroforming of napthas.

Figure 1:
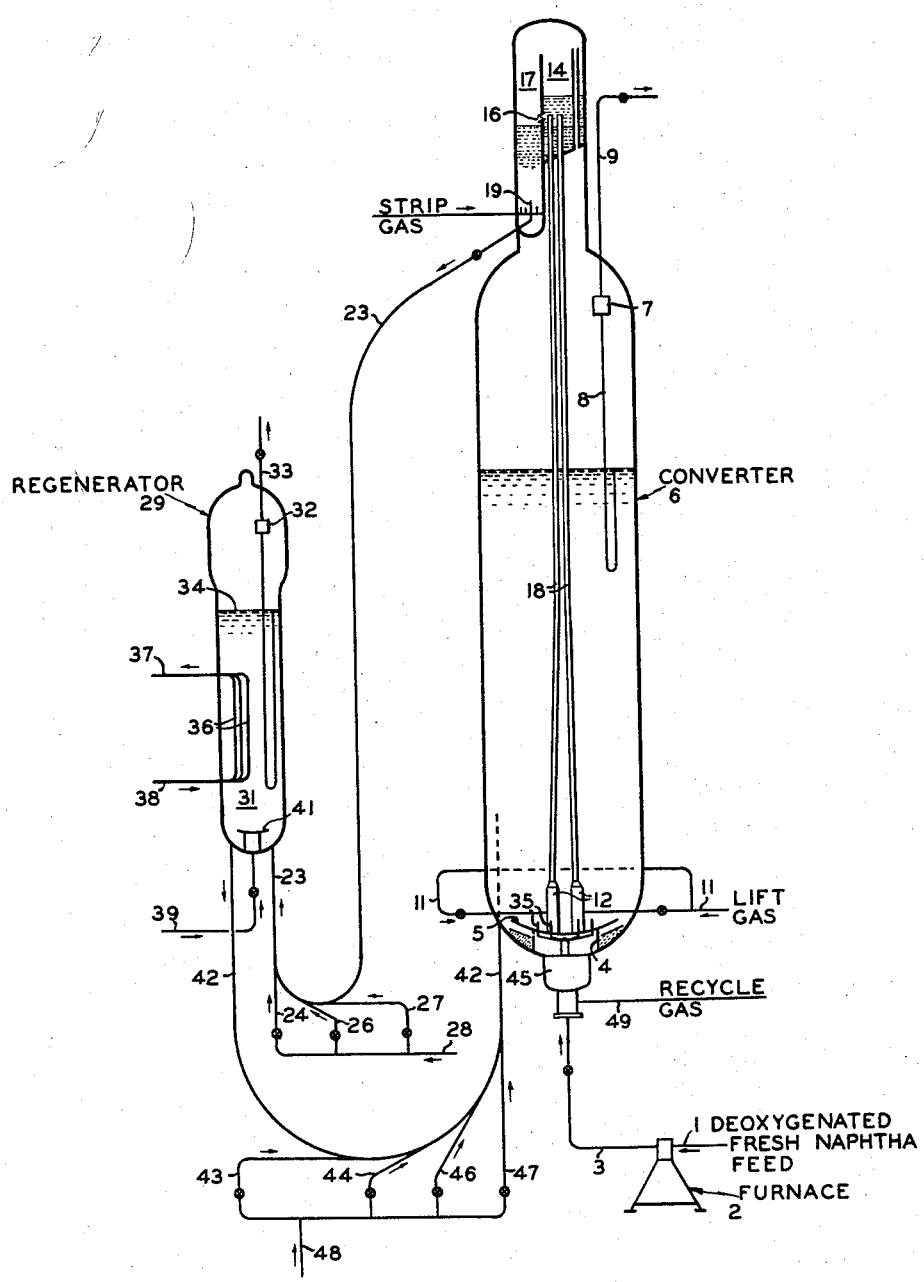

Referring to Figure 1, a desired fresh naptha feed, having a molecular weight of 109 and a 55.0 A.P.I. gravity, is introduced through a conduit 1 of a conventional preheating furnace 2 wherein the naptha is preheated to a temperature of approximately 1000° F. The preheated feed is then passed through a conduit 3 into the bottom of a vertically elongated cylindrical reaction zone 6 at a rate of approximately 190,640 pounds per hour to reactant distributing means 35, for introducing the preheated feed into a fluidized bed of hydroforming catalyst introduced to the bottom of reactor 6 through conduit 42. Preheated recycle gases, at a temperature of approximately 1150° F., are introduced through conduit 49 to cylindrical chamber 50, connected to the bottom of chamber 45, which distributes recycle gas to chamber 40 through slots or perforations 50. Chamber 40, more specifically defined hereinafter, distributes the recycle gases throughout the bottom of the fluidized bed of catalyst. A portion of these hot recycle gases pass through an annular zone of restricted cross-sectional area formed by a circular dish-shaped plate 5, outwardly and upwardly along the reactor wall of 6 of the conversion zone. The hot recycle gases and preheated fresh feed commingle in the dense fluidized contact material above the recycle gas distributing plate 5 and pass upwardly through the dense fluidized catalyst bed thereabove for conversion into desirable reaction products. The products of the reaction then pass into a more dilute catalyst phase above the dense catalyst phase and into a plurality of cyclone separators, such as separator 7, in which catalyst fines are removed from the reaction products and return to the dense fluidized catalyst bed through dipleg 8, with the reaction products at a temperature of about 915° F. removed from the reaction zone at a rate of approximately 170,000 pounds per hour. The molecular weight of the reaction products is approximately 19.9. A portion of the spent catalyst is transferred as a dilute catalyst phase in lift lines 18 by lift gas introduced through conduit 11 at a rate of approximately 7400 pounds per hour. The lift gas, having a molecular weight of approximately 11.3, is preheated in a conventional preheating furnace, not shown, to a temperature of approximately 1100° F. The hot transporting or lift gas conveys contaminated contact material from the bottom of the reaction zone 6 upwardly through conduit 18 at a linear velocity of at least about 8 feet per second to a settling or accumulation zone 14 superimposed thereabove the reaction zone, wherein products of reaction and lift gas are separated from the catalyst and the catalyst settles out in a dense fluidized phase condition. The contact material, at a temperature of approximately 870° F., is then transferred to a stripping zone 17 adjacent to said accumulation zone through suitable transfer means 16. The settling chamber, stripping chamber, and reaction chamber are in open communication with one another in the upper portion of said chambers. Suitable stripping gases, which may be recycle gases or superheated steam, are introduced into the bottom of stripping zone 17 and maintains the contact material therein in a dense fluidized condition to facilitate withdrawal of the contact material from the stripping zone by withdrawal conduit 19, concentrically positioned in the stripping zone and above the stripping gas inlet means. The stripping gases and lift gases are commingled with the reaction products and removed through separator 7 and conduit 9 from the reaction zone. The contact material is then transferred through conduit 23 to the vertically elongated regeneration zone 29. Steam recycle gas or inert gas may be introduced through conduits 28, 27, 26 and 24 to assist in transfer of the contact material in conduit 23 to regeneration zone 29. Contaminated contact material is removed from stripping zone 17 at a rate of approximately 192,000 pounds per hour. Regeneration gases are introduced into the bottom of vertical elongated regenerator 29 through conduit 39 into a regeneration gas distributing chamber 41, which may be similar in design to the distributing chamber described hereinafter for directing and distributing regeneration gases uniformly throughout the bottom of the dense fluidized bed of contact material. Cooler 36 submerged in the dense fluidized bed of contact material in the regeneration zone 29, comprising coolant inlet conduit 38 and outlet conduit 37, provides means for controlling the temperature within the desired range during combustion of carbonaceous deposits and other contaminants on the contact material. Regeneration gases containing controlled amounts of oxygen introduced through conduit 39 removes carbonaceous deposits from the contact material in the regeneration zone. The products of combustion are separated from the contact material in a dilute phase superimposed above the dense phase of contact material in the regeneration zone. The hot products of regeneration are then passed through cyclone separator 32 and removed from the regeneration zone 29 through conduit 33. The regenerated contact material is withdrawn from the bottom of the dense fluidized bed of contact material in the regeneration zone by conduit 42 at a rate of approximately 191,000 pounds per hour through conduit 42 and transferred to the bottom of reaction zone 6. Air or recycle gases may be introduced through conduits 48, 43, 44, 46 and 47 to assist in transferring the regenerated contact material in conduit 42 to reaction zone 6.

Figure 2:
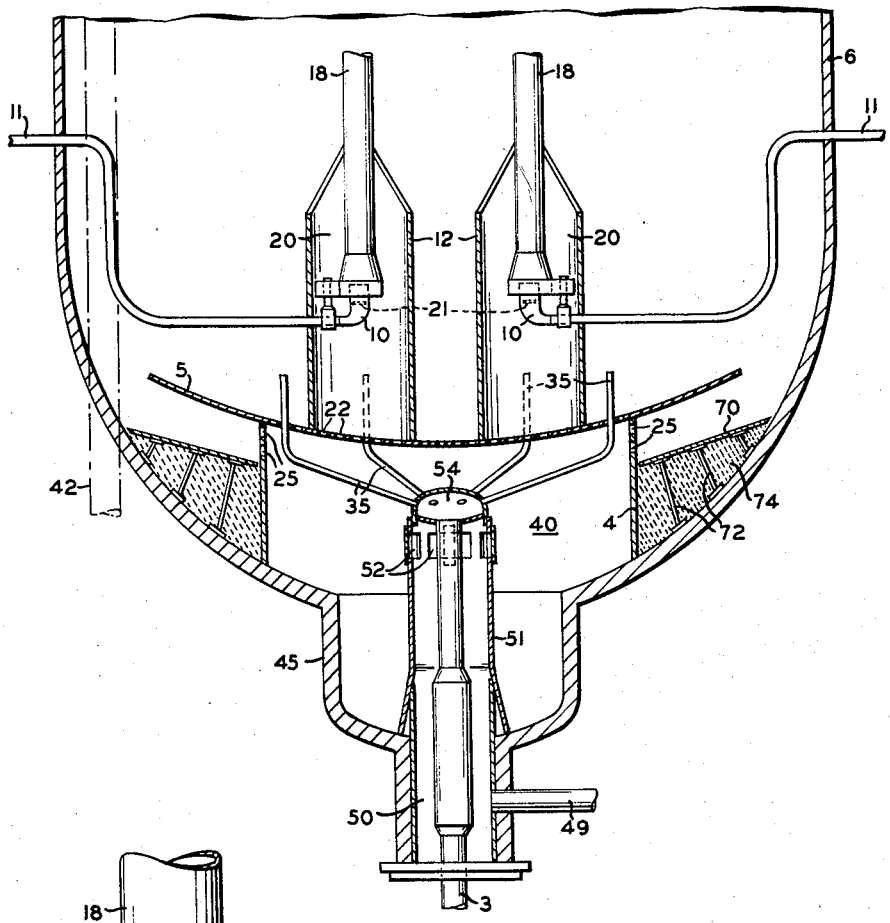
Figure 2 is a diagrammatical illustration of the apparatus of Figure 1 for introducing reactant vapors to a fluidized bed of finely divided contact material and for transferring finely divided contact material from the bottom of a reaction zone to a settling or accumulation zone above the reaction zone with a suitable lift gas.
Figure 3:
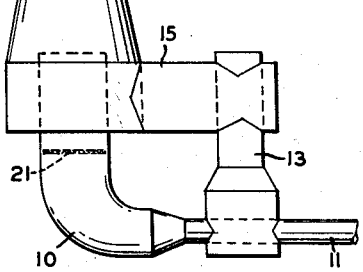
Figure 3 is an enlarged diagrammatical view of the lift gas inlet means of Figure 2 at the bottom of the vertical catalyst riser.

In accordance with the present invention, the essential features are more specifically defined by referring to Figures 2 and 3, which show diagrammatically in cross-section, the apparatus for removing contaminated contact mterial from the bottom of the reaction zone to be transferred to an accumulating and stripping zone positioned above the reaction zone. More specifically, Figure 2 shows the bottom portion of a vertically elongated cylindrical reaction zone 6 which is hemispherical at the bottom. An annular cylindrical chamber 50, closed at its bottom and formed by conduit 3 extending therethrough and by walls 51, extends vertically upward into chamber 40 located in the bottom of the reaction zone and formed in the lower part by wall 45 forming the lower wall of the reaction vessel. Chamber 40 is formed in the upper part by cylindrical wall 4 which is concentric with the vertical axis of vessel 6 and extends upwardly from the bottom thereof. Chamber 50 is perforated in the upper portion of its wall by elongated slots or openings 52 around its upper periphery in a plane above the point of contact of the chamber with the reactor walls. An inlet conduit 49, connected to the bottom of said cylindrical chamber 50, provides means for introducing recycle gas into the bottom of the reaction zone through chamber 50 containing slots 52 into chamber 40. The cylindrical chamber 40, confined by walls 4 and capped by an enlarged circular plate 5, which may be flat, domed or dish-shaped as shown, is concentric with the vertical axis and extending upwardly from the bottom of the reactor walls, forming a second chamber partially around cylindrical chamber 50 containing slots or outlets 52. The cylindrical wall 4, encompassing chamber 40, is perforated with openings 25 around its circumference in its upper portion. The cylindrical wall 4 encompassing chamber 40 is capped with an enlarged circular dish-shaped plate 5, which extends almost to the walls of the cylindrical reactor 6 to form an annular space therebetween, the dish-shaped plate 5 being perforated in the circular area between the point of contact of the cylindrical wall 4 and the dish-shaped plate 5, and the dish-shaped plate 5 being non-perforated in the annular area extending upwardly and outwardly beyond the periphery of the cylindrical wall 4. Positioned below the annular non-perforated portion of dish-shaped plate 5, is a second annular impervious plate 70 adjacent to the hemispherical bottom of the cylindrical reactor 6 which is positioned above the bottom of the reactor but below the perforations in the upper portion of cylindrical wall 4, thereby forming an annular zone between the non-perforated section of dish-shaped plate 5 atop the cylindrical wall 4 and the annular plate 70 positioned adjacent to the bottom of the reactor 6. This annular zone provides means for directing a portion of the recycle gases introduced through conduit 49, chambers 50 and 40 to be directed outwardly and upwardly along the reactor walls 6. The annular space below annular plate 70 s fielled with a refractory material 74, such as bricks, slag or other material which will be unaffected by the heat of the reaction zone. In addition, this material should be easily broken out to facilitate repair of the reactor, should the need arise. Annular plate 70 is connected or fastened to the walls of reactor 6 with studs 72 or other suitable means known in the art. Conduit 3, extending vertically and upwardly through chambers 50 into chamber 40, terminates as chamber 54 from which a plurality of distributing conduits 35 pass outwardly and upwardly within wall 4 of chamber 40 through the perforated section of dish-shaped plate 5 into the reaction zone thereabove, providing a plurality of nozzles in a circular arrangement above distributing chamber 40. Superimposed and attached to dish-shaped plate 5 is a plurality of chambers or walls 20 encompassed by cylindrical walls 12 which are open at each end. The bottom of the chamber 20 is in open communication with distributing chamber 40 by a plurality of perforations or openings 22. Recycle gases introduced to the bottom of chamber 20 maintain the contact material therein in a fluidized condition and prevent contact material from falling downwardly into chamber 40 therebelow. A vertical elongated conduit 18 extends downwardly into the upper open-end of cylindrical chamber 20 substantially below its upper periphery and terminates within the cylindrical chamber 20. The conduit may be a straight section or expanded as shown. A plurality of rods forming a cone with elongated slots therebetween, commonly referred to as a "bird-cage," is connected to the periphery of vertical conduit 18 and the upper periphery of the cylindrical walls 12 to form a grid or "bird-cage" to prevent large masses of agglomerated contact material from falling into chamber 20. A conduit 11 extends through the reactor wall 6 into each of said chambers 20, but above perforated plate 5, and terminates in an expanded cylindrical L-shaped nozzle 10 pointing directly upward and extending partially into the bottom of expanded section of vertical conduit 18 concentric therewith, to form an annular zone between nozzle 10 and the expanded section. Spent contact material in the reaction chamber 6 is withdrawn downwardly through the "bird-cage" atop chamber 20 to the bottom thereof and transferred upwardly through vertical conduits 18 by lift gas introduced through conduit 11 at a velocity sufficient to transport the contact material vertically upward through conduit 18 to chamber 14. A portion of the recycle gases introduced through conduit 49 to chamber 40 pass upwardly through opening 22 in plate 5 to maintain the contact material in chamber 20 thereabove as a dense pseudo-liquid phase of fluidized contact material.

Figure 3 shows a more detailed diagrammatic view of the lift gas inlet nozzle 10 and its relation with respect to the expanded inlet of vertical riser conduit 18. Positioned below the top and within nozzle 10, is a perforated grid which reduces the tendency of contact material from falling down into the lift gas nozzle during a period of operation wherein the velocity of the lift gas is maintained at a low value. The perforated plate or screen which is contiguous with the walls of nozzle 10, is so positioned below the top of nozzle 10 to allow the velocity of the jet-like streams of lift gases coming from the perforated grid to reduce their velocity component prior to entering the bottom of vertical riser 18. By so positioning the grid, the high velocity lift gas jets are prevented from contacting the catalysts or contact material which would otherwise cause excessive attrition of the contact material. Generally speaking, the perforated grid is located 6 to 12 inches below the top of nozzle 10.

The particular mehod and apparatus for removing and transporting contaminated contact material from the bottom of the reaction chamber provides a method of optimum flexibility for varying the rate of withdrawal of contaminated contact material, thereby controlling the deposition of carbonaceous deposits upon the contact material in the reaction chamber. Since the rate of withdrawal of contaminated contact material is a function of the pressure head it develops, it can be easily controlled by the velocity of the lift gas emitted from the lift gas nozzle to the catalyst riser conduits. Furthermore, introduction of a small amount of recycle gases to the bottom of the withdrawal hopper, maintains the contact material therein in a fluidized condition and prevents any tendency of the contact material to bridge, agglomerate or resist flow through the vertical riser conduits.

EXAMPLE 1

The basic design of a fluid hydroformer was set by the overall requirement for a high quality aviation gasoline blending stock. In order to produce the required aviation blending material, it was necessary to reform a select, narrow boiling range (224–272° F.) naphtha at a high severity. Run I with the fluid hydroformer was continued for 42 days. Although acceptable products were made during most of this period, the operation of the unit was considered generally unsatisfactory. Inspection of the unit after shut-down revealed that about ten tons of hard, black deposit (analysis showed as high as 90 percent carbon) was found in the form of a layer around the outer edge of the reactor grid. To circumvent this problem, improved recycle gas distribution was provided, as shown by Figure 2, at the outer edge of the grid to prevent stagnation in the zone where the coke deposit had formed. This modification provided additional advantages to the extent that it prevented the catalyst from defluidizing at the reactor walls and provided a more uniform temperature throughout the catalyst bed at the reactant inlet, with lessening of the attendant hydrocracking on the stagnant zone, which results in a considerable rise in temperature due to exothermic reactions. Run II was started and continued with excellent success. As the carbon and sulfur content of the catalyst was lowered to reasonable levels, attributed to good catalyst circulation, the effective activity of the catalyst improved. After 120 days of operation, the difficulties experienced in run I had been eliminated and aviation gasoline of the desired octane rating was continuously produced.

*Table I*

|  | Operating Conditions—Run II | | | | |
| --- | --- | --- | --- | --- | --- |
| No. Days | 8 | 15 | 15 | 15 | 6 |
| Feed Rate, b.p.d. | 17,570 | 17,790 | 18,300 | 18,880 | 18,550 |
| Reactor Temp., °F | 918 | 920 | 911 | 908 | 906 |
| Cat. to Oil Ratio | 0.87 | 0.75 | 0.84 | 0.74 | 0.77 |
| Space Velocity, W./Hr./W | 0.34 | 0.35 | 0.34 | 0.35 | 0.33 |
| Reactor Pressure, p.s.i.g | 225 | 225 | 225 | 225 | 225 |
| $C_5$+Hydroformate Oct., F-1 (clear) | 93.4 | 92.2 | 92.0 | 90.9 | 90.6 |
| Recycle Gas, s.c.f./B | 5,480 | 5,410 | 5,330 | 5,160 | 5,160 |
| Mol Percent $H_2$ | 67.5 | 64.0 | 66.1 | 66.6 | 66.2 |
| Rec. Gas Furnace Out, °F | 1,154 | 1,171 | 1,157 | 1,152 | 1,148 |
| Naphtha Furnace Out, °F | 961 | 962 | 951 | 947 | 936 |
| Carbon on Cat., Wt. Percent: | | | | | |
| Spent | 0.59 | 0.70 | 0.66 | 0.74 | 0.71 |
| Regenerated | 0.02 | 0.03 | 0.04 | 0.06 | 0.05 |
| Sulfur on Spent Cat., Wt. Percent | 0.05 | 0.07 | 0.07 | 0.10 | 0.04 |
| Reactor Bed Height, Ft.[1] | 46.5 | 45.0 | 46.0 | 44.5 | 45.5 |
| Catalyst Holdup, M lbs.: | | | | | |
| Reactor | 571.0 | 563.0 | 594.0 | 592.0 | 616.0 |
| Regenerator | 10.3 | 11.9 | 9.8 | 10.0 | 16.4 |
| Total [2] | 601.3 | 594.9 | 623.8 | 622.0 | 652.4 |
| Reactor Density, #/Ft.[3] | 43 | 44 | 46 | 47 | 48 |
| Regenerator Holdup Time, Min | 3.68 | 4.89 | 3.48 | 3.89 | 6.23 |
| Cat. Circulation, #/hr | 168,000 | 146,000 | 169,000 | 154,000 | 158,000 |
| Regen. Temp., °F | 1,097 | 1,109 | 1,084 | 1,107 | 1,102 |
| Combustion Air, #/hr | 21,900 | 21,960 | 22,540 | 22,210 | 22,610 |
| Regen. Density, #/Ft.[3] | 22 | 18 | 19 | 19 | 25 |

[1] Feet above grid.
[2] 20,000# catalyst in lines, stripper and hopper (est.).

It is intended that all matters contained in the above detailed description, or shown in the accompanying drawings, shall be interpreted as illustrative an not in a limiting sense. Various modifications and alteration of the process and arrangement of apparatus of this invention may become apparent to those skilled in the art without departing from the scope of this invention. The theories and specific examples are offered as a means for better understanding of the invention and are not to be construed as unnecessarily limiting to the invention.

Having described my invention, I claim:

1. A hydroforming process which comprises contacting a naphtha feed with a dense fluidized mass of finely divided solid reforming catalyst in a reaction zone at a pressure of at least about 30 p.s.i.g., thus contaminating the catalyst with volatile and non-volatile hydrocarbonaceous material, withdrawing the contaminated catalyst directly from the lower portion of the dense mass of fluidized catalyst in said reaction zone and passing the same upwardly as a more dilute phase suspended in a gaseous material at a linear velocity of at least about 8 feet per second in a substantially vertical elongated confined zone encompassed by said reaction zone to an accumulation zone positioned above said reaction zone, said dilute phase formed by passing said gaseous material through a grid which reduces the tendency of backflow of catalyst thereby forming a plurality of high velocity streams which combine to form a single gaseous stream of reduced velocity prior to contacting the catalyst in said elongated confined zone, passing the contaminated contact material to a stripping zone adjacent to said accumulation zone, said stripping zone, accumulation zone and reaction zone being in open communication with one another in the upper portion thereof, stripping volatile reaction products from said catalyst as a dense fluidized mass in said stripping zone, commingling stripped products of reaction with reaction products, removing commingled products of reaction from said reaction zone, withdrawing stripped catalyst from said stripping zone and passing the same downwardly to a regeneration zone, removing at least a portion of the non-volatile hydrocarbonaceous material from the catalyst in the regeneration zone and passing catalyst from the regeneration zone to the lower portion of the reaction zone.

2. A hydroforming process which comprises contacting a naphtha feed with a dense fluidized mass of finely divided solid reforming catalyst in a reaction zone, thus contaminating the catalyst with volatile and non-volatile hydrocarbonaceous material, withdrawing the contaminated catalyst directly from the lower portion of the dense mass of fluidized catalyst in said reaction zone and passing the same upwardly as a more dilute phase suspended in a gaseous material in a substantially vertical elongated confined zone to an accumulating zone, said dilute phase formed by passing said gaseous material through a grid which reduces the tendency of backflow of catalyst therethrough thereby forming a plurality of high velocity gaseous streams which combine to form a single gaseous stream prior to contacting the catalyst to form said dilute phase in said elongated confined zone, passing the contact material to a stripping zone adjacent to said accumulation zone, said stripping zone, accumulation zone and said reaction zone being in open communication with one another in the upper portion thereof, stripping volatile reaction products from said catalyst as a dense fluidized mass in said stripping zone, removing commingled stripping gas, gaseous material and products of reaction from said reaction zone, withdrawing catalyst from said stripping zone and passing the same to a regeneration zone, and passing catalyst from the regeneration zone to the lower portion of the reaction zone.

3. A hydrocarbon conversion process which comprises contacting a hydrocarbon reactant with a dense fluidized mass of catalyst in a reaction zone thereby contaminating the catalyst with volatile and non-volatile reaction products, withdrawing a portion of the contaminated catalyst from said reaction zone and passing the same into a second zone encompassed by said reaction zone, maintaining the catalyst in said second zone as a dense fluidized mass of finely divided catalyst, passing said contaminated catalyst from said second zone as a dilute mass of finely divided fluidized catalyst suspended in a gaseous material upwardly through an elongated confined zone in said reaction zone to an accumulation zone, said dilute mass formed by passing said gaseous material through a grid which reduces the tendency of backflow of catalyst therethrough and forms a plurality of high velocity gaseous streams which combine to form a single gaseous stream of reduced velocity prior to contacting the catalyst to form said dilute mass in said elongated confined zone, passing contaminated catalyst as a dense fluidized mass downwardly from said accumulation zone to a stripping zone, stripping volatile reaction products from the dense fluidized mass of catalyst in said stripping zone, commingling reaction products with stripped reaction products and removing said commingled products from the reaction zone, passing stripped catalyst to a regeneration zone for the removal of non-volatile reaction products from the catalyst and returning regenerated catalyst to the lower portion of the reaction zone.

4. A conversion process which comprises contacting a reactant with a dense fluidized mass of contact material in a conversion zone thereby producing a reaction product and contaminating the contact material with products of reaction, withdrawing a portion of the contaminated contact material downwardly as an annular stream into a second confined zone in the lower portion of said reaction zone, reversing the flow of said downwardly withdrawn annular stream and passing the same upwardly as a confined dilute phase of contact material suspended in a gaseous material to a settling zone, said dilute phase formed by passing said gaseous material through a grid which reduces the tendency of backflow of contact material therethrough and forms a single gaseous stream of reduced velocity above said grid prior to contacting the contact material to form said confined dilute phase, separating contaminated contact material from said gaseous material in said settling zone, passing contact material from said settling zone as a dense fluidized mass to a stripping zone, stripping contaminated contact material in said stripping zone with a stripping gas and withdrawing products of reaction, stripping gas and gaseous material from the upper portion of said reaction zone.

5. A method for handling fluidized catalyst in a hydrocarbon conversion zone containing a reaction zone in the lower part and a catalyst accumulation zone in the upper part thereof which comprises, withdrawing a dense fluidized annular stream of catalyst downwardly from said reaction zone into a second confined zone in the lower portion of said reaction zone, passing a first fluidizing gas into the lower portion of said second confined zone to maintain the catalyst in a dense fluidized pseudo-liquid condition therein, passing a second fluidizing gas as a separated confined stream from said first gas stream into the lower portion of said second confined zone, passing said second fluidizing gas prior to contact with catalyst through a plurality of openings which reduces the tendency of backflow of catalyst therethrough and to divide said gas stream into a plurality of high velocity gas streams, thereafter combining said plurality of high velocity gas streams into a stream of reduced velocity and passing the stream of reduced velocity into contact with the catalyst from said second confined zone for transfer upwardly to said accumulation zone.

6. An integrated vessel for effecting conversion of reactants in the presence of finely divided fluidized contact material comprising in combination a substantially vertical elongated reaction chamber, an accumulation chamber adjacent to a stripping chamber positioned above and in direct contact with said reaction chamber, said stripping chamber and said accumulation chamber in open communication with one another in the upper portion thereof, a substantially vertical first elongated conduit extending upwardly from the lower portion of said reaction chamber into said accumulation chamber and in open communication therewith, a cylindrical hopper encompassing the inlet to said first vertical conduit in the lower portion of said reaction chamber thereby forming an open annular zone between the wall of said first vertical conduit and the wall of said cylindrical hopper, an elongated second conduit terminating in an expanded cylindrical conduit of larger diameter than said second elongated conduit, said expanded cylindrical conduit extending vertically upward into the bottom of said first vertical conduit thereby forming an open annular zone therebetween, said expanded cylindrical conduit containing a perforated member within and below the outlet of said expanded conduit, means for introducing reactants to the bottom of said reaction chamber, means for removing conversion products from said vessel, means for passing contact material from said accumulation chamber to said stripping chamber, means for removing and passing contact material from said stripping chamber to a regeneration chamber, and means for passing contact material to the bottom of said reaction chamber from said regeneration chamber.

7. An integrated vessel for effecting conversion of reactants in the presence of finely divided fluidized contact material comprising in combination a reaction chamber, an accumulation chamber adjacent to a stripping chamber positioned above said reaction chamber, said stripping chamber and said accumulation chamber in open communication with one another, a substantially vertical elongated first conduit extending upwardly from the lower portion of said reaction chamber into said accumulation chamber and in open communication therewith, a hopper encompassing the inlet to said first elongated conduit in the lower portion of said reaction chamber, a second conduit terminating in an expanded cylindrical conduit of larger diameter than said second conduit, said expanded cylindrical conduit extending vertically upward into the bottom of said first conduit thereby forming an open annular zone therebetween, said expanded conduit containing a perforated member within and below the outlet of said expanded conduit, means for introducing reactants to the bottom of said reaction chamber, means for removing conversion products from said vessel, means for passing contact material from said accumulation chamber to said stripping chamber, means for removing and passing contact material from said stripping chamber to a regeneration chamber, and means for passing contact material to the bottom of said reaction chamber from said regeneration chamber.

8. An apparatus for effecting conversion of reactants in the presence of finely divided fluidized contact material comprising in combination, a reaction vessel, a stripping chamber and a settling chamber, said stripping chamber and said settling chamber in open communication with one another in the upper portion thereof and positioned in the upper part of said reaction vessel, a withdrawal hopper in the bottom of said reaction vessel, a first elongated open end conduit extending substantially vertically upward from within said hopper into said settling chamber, a second conduit extending through said reaction vessel into said hopper, said second conduit terminating in an expanded cylindrical L shaped nozzle which extends upwardly into the bottom of said first open end conduit, a perforated partition contiguous with the inner wall of said nozzle positioned below the top but above the bend in said nozzle, means for introducing reactants to the bottom of said reaction vessel, means for passing contact material from said settling chamber to said stripping chamber, means for introducing stripping gas to said stripping chamber, and means for removing commingled stripped products and reaction products from said reaction vessel.

9. An apparatus for the conversion of hydrocarbons in the presence of fluidized contact material which comprises in combination, a vertical elongated vessel of smaller diameter in its upper portion, a settling chamber and a stripping chamber adjacent to one another and in open communication with one another in the upper portion thereof confined within the portion of said vessel of smaller diameter, a hopper confined within the lower portion of said vessel, a first substantially vertical elongated conduit extending from within said hopper upwardly into said settling chamber, a second conduit extending through said vessel and upwardly into the bottom of said first conduit, a perforated partition within said second conduit positioned below the outlet of said conduit, said second conduit forming an annular zone with the walls of said first conduit, said first conduit forming an annular zone with the walls of said hopper, a perforated partition contiguous with the walls of said hopper positioned below said second conduit, means for introducing a gaseous material to the bottom of said hopper, means for introducing a reactant to the bottom of said vessel, means for withdrawing products of reaction from said vessel, means for passing contact material from said settling chamber to said stripping chamber, means for introducing a gaseous material to the bottom of said stripping chamber and means for withdrawing contact material from the bottom of said stripping chamber at a point above said gaseous material inlet means.

10. An apparatus for the hydroforming of naphthas in the presence of a fluidized hydroforming catalyst to produce hydroformate products and contaminate the catalyst, comprising in combination an elongated vertical cylindrical reaction vessel of smaller diameter in its upper portion, an accumulator chamber and stripping chamber in open communication with one another confined within the upper portion of the vessel of smaller diameter, means for distributing a fluidizing gas uniformly across the bottom of the bed of catalyst in the lower portion of said vessel to maintain the catalyst in a dense fluidized condition, means for introducing the naphtha feed to the fluidized bed of catalyst above the fluidizing gas distributing means, a vertical well positioned above and in contact with said fluidizing gas distributing means, means for passing fluidizing gas upwardly through said well, a first elongated open end conduit extending downward from the lower portion of said accumulator chamber into said well forming an annular zone therewith, a second conduit of smaller diameter than said first conduit extending upward into the bottom of said first elongated open end conduit forming an annular zone therebetween, a foraminous partition within said second conduit of smaller diameter positioned 6 to 12 inches below the outlet of said conduit, means for passing catalyst from said accumulator chamber to said stripping chamber, means for introducing stripping gas to the bottom of said stripping chamber, means for withdrawing catalyst from said stripping chamber above said stripping gas inlet means, means for commingling stripping gas with gaseous products of reaction, and means for removing the commingled gases from the reaction vessel.

11. An apparatus for effecting conversion of reactants in the presence of finely divided fluidized contact material comprising in combination, a reaction vessel, a stripping chamber and a settling chamber, said stripping chamber and said settling chamber in open communication in the upper portion thereof and positioned in the upper part of said reaction vessel, a withdrawal hopper in the lower portion of said reaction vessel, means for maintaining contact material fluidized in said hopper, a first elongated conduit extending substantially vertically upward from within said hopper into said settling chamber, a second conduit extending through said reaction vessel into said hopper, said conduit terminating in an expanded cylindrical L shaped nozzle extending upwardly into the bottom of said vertical conduit, a perforated partition contiguous with the inner wall of said nozzle positioned below the top but above the bend in said nozzle, means for introducing reactants to the bottom of said reaction vessel below said withdrawal hopper, means for passing contact material downwardly from said settling chamber to said stripping chamber, means for withdrawing contact material from said stripping chamber, means for introducing stripping gas to said stripping chamber below said withdrawal means, and means for removing commingled stripped products and reaction products from said reaction vessel.

12. An apparatus for effecting conversion of reactants in the presence of finely divided fluidized contact material comprising in combination a reaction vessel, a stripping chamber and an accumulation chamber positioned in the upper part of said reaction vessel, an open-end hopper positioned above a perforated partition in the lower portion of said reaction vessel, a first elongated conduit extending substantially vertically upward from within said hopper into said accumulation chamber, a second conduit extending into the lower portion of said hopper and terminating within the inlet to said first elongated vertical conduit, means for introducing reactants to the lower portion of said reaction vessel, means for introducing a fluidizing gas to the lower portion of said reaction vessel below said reactant inlet, means for passing a portion of said fluidizing gas to the lower portion of said hopper, and means for removing products of reaction from said reaction vessel.

References Cited in the file of this patent

UNITED STATES PATENTS

| | | |
|---|---|---|
| 2,601,676 | Trainer et al. | June 24, 1952 |
| 2,666,731 | Bergstrom | Jan. 19, 1954 |
| 2,689,973 | Lee et al. | Sept. 28, 1954 |
| 2,695,866 | McGrath | Nov. 30, 1954 |
| 2,761,820 | Snuggs et al. | Sept. 4, 1956 |
| 2,791,542 | Nathan | May 7, 1957 |